(12) United States Patent
Sorkin

(10) Patent No.: US 11,859,351 B2
(45) Date of Patent: Jan. 2, 2024

(54) DUCT COUPLER FOR USE WITH DUCTS IN A WET JOINT OF SEGMENTAL CONCRETE CONSTRUCTION

(71) Applicant: Felix Sorkin, Stafford, TX (US)

(72) Inventor: Felix Sorkin, Stafford, TX (US)

(*) Notice: Subject to any disclaimer, the term of this patent is extended or adjusted under 35 U.S.C. 154(b) by 350 days.

(21) Appl. No.: 17/095,604

(22) Filed: Nov. 11, 2020

(65) Prior Publication Data
US 2021/0062941 A1 Mar. 4, 2021

Related U.S. Application Data

(62) Division of application No. 14/274,178, filed on May 9, 2014, now abandoned.

(60) Provisional application No. 61/841,743, filed on Jul. 1, 2013.

(51) Int. Cl.
| | | |
|---|---|---|
| *E01C 11/06* | (2006.01) | |
| *F16L 13/11* | (2006.01) | |
| *F16L 21/02* | (2006.01) | |
| *F16L 37/138* | (2006.01) | |
| *F16L 25/00* | (2006.01) | |

(52) U.S. Cl.
CPC ............ *E01C 11/06* (2013.01); *F16L 13/113* (2013.01); *F16L 13/116* (2013.01); *F16L 21/022* (2013.01); *F16L 25/0036* (2013.01); *F16L 37/138* (2013.01)

(58) Field of Classification Search
CPC ........ E01C 11/06; F16L 13/116; F16L 13/113
See application file for complete search history.

(56) References Cited

U.S. PATENT DOCUMENTS

| | | | | |
|---|---|---|---|---|
| 3,873,138 A | * | 3/1975 | Griffiths | F16L 55/1015 285/369 |
| 5,263,746 A | * | 11/1993 | Cornwall | F16L 5/10 285/192 |
| 5,474,335 A | | 12/1995 | Sorkin | |
| 5,775,849 A | | 7/1998 | Sorkin | |
| 5,954,373 A | | 9/1999 | Sorkin | |
| 6,550,816 B1 | | 4/2003 | Sorkin | |
| 6,659,135 B2 | | 12/2003 | Sorkin | |

(Continued)

OTHER PUBLICATIONS

Krauser, Larry B. Post-Tensioning Tendon Protection Strategies for Precast Elements, 2009.[online],[retrieved on Oct. 14, 2015]. Retrieved from Internet :<URL:http://web.archives.org/web/20100312131410/http://www.gti-usa.net/Published-and-White-Papers.shtml>.*

*Primary Examiner* — Zachary T Dragicevich
*Assistant Examiner* — James A Linford
(74) *Attorney, Agent, or Firm* — Hunton Andrews Kurth LLP

(57) ABSTRACT

A duct coupling system has a first concrete segment, a first duct positioned in the first concrete segment so as to have an end extending outwardly therefrom, a second concrete segment, a second duct positioned in the second concrete segment so as to have an end extending outwardly therefrom in a direction toward the end of the first duct, and a tubular member slidably positioned over the ends of the first and second ducts so as to join the first and second ducts together in a liquid-tight relationship. The first concrete segment is positioned in spaced relation to the second concrete segment. A wet joint is formed in the space between the first concrete segment and the second concrete segment. The tubular member is embedded in the wet joint.

3 Claims, 3 Drawing Sheets

(56) References Cited

U.S. PATENT DOCUMENTS

| | | |
|---|---|---|
| 6,666,233 B1 | 12/2003 | Sorkin |
| 6,752,435 B1 | 6/2004 | Sorkin |
| 6,764,105 B1 | 7/2004 | Sorkin |
| 6,834,890 B2 | 12/2004 | Sorkin |
| 6,843,031 B1 | 1/2005 | Sorkin |
| 6,874,821 B1 | 4/2005 | Sorkin |
| 6,889,714 B1 | 5/2005 | Sorkin |
| 7,267,375 B1 | 9/2007 | Sorkin |
| 7,273,238 B1 | 9/2007 | Sorkin |
| 7,621,103 B1 | 11/2009 | Sorkin |
| 7,686,347 B1 | 3/2010 | Sorkin |
| 7,695,021 B1 | 4/2010 | Sorkin |
| 8,016,326 B1 | 9/2011 | Sorkin |
| 8,398,123 B1 | 5/2013 | Sorkin |
| 8,640,292 B1 | 2/2014 | Sorkin |
| 9,399,869 B2 | 7/2016 | Sorkin |
| 9,423,059 B1 | 8/2016 | Sorkin |
| 9,493,951 B2 | 11/2016 | Sorkin |

\* cited by examiner

DUCT COUPLER FOR USE WITH DUCTS IN A WET JOINT OF SEGMENTAL CONCRETE CONSTRUCTION

RELATED U.S. APPLICATIONS

The present application is a divisional of U.S. application Ser. No. 14/274,178, filed May 9, 2014, which claims priority from U.S. Provisional Patent Application Ser. No. 61/841,743, filed on Jul. 1, 2013 and entitled "Duct Coupler for Use with Ducts in a Wet Joint of Segmental Concrete Construction".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the assembly and installation of precast concrete segments used in construction activities, such as bridge and highway construction. More particularly, the present invention relates to couplers for joining the ends of ducts as used in such precast concrete segments. Additionally, the present invention relates to couplers for use with ducts in association with the use of wet joints formed between the concrete segments.

2. Description of Related Art Including Information Disclosed Under 37 CFR 1.97 And 37 CFR 1.98

For many years, the design of concrete structures imitated the typical steel design of column, girder and beam. With technological advances in structural concrete, however, its own form began to evolve. Concrete has the advantages of costing less than steel, of not requiring fireproofing, and of its plasticity, a quality that lends itself to free flowing or boldly massive architectural concepts. On the other hand, structural concrete, though quite capable of carrying almost any compressive load, is weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potential of the concrete. The skeleton frame, in which the floors and roofs rest directly on exterior and interior reinforced-concrete columns, has proven to be the most economic and popular. Reinforced-concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the formwork. The size and number of the steel bars depends completely upon the imposed loads and the need to transfer these loads evenly throughout the building and down to the foundation. After the reinforcement is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potential when it is used in pre-stressed or post-tensioned members. Spans as great as one hundred feet can be attained in members as deep as three feet for roof loads. The basic principle is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel cable, is held loosely in place while the concrete is placed around it. The reinforcing tendon is then stretched by hydraulic jacks and securely anchored into place. Pre-stressing is done with individual members in the shop and post-tensioning as part of the structure on the site.

In a typical tendon tensioning anchor assembly used in such post-tensioning operations, there are provided anchors for anchoring the ends of the cables suspended therebetween. In the course of tensioning the cable in a concrete structure, a hydraulic jack or the like is releasably attached to one of the exposed ends of each cable for applying a predetermined amount of tension to the tendon, which extends through the anchor. When the desired amount of tension is applied to the cable, wedges, threaded nuts, or the like, are used to capture the cable at the anchor plate and, as the jack is removed from the tendon, to prevent its relaxation and hold it in its stressed condition.

Multi-strand tensioning is used when forming especially long post-tensioned concrete structures, or those which must carry especially heavy loads, such as elongated concrete beams for buildings, bridges, highway overpasses, etc. Multiple axially aligned strands of cable are used in order to achieve the required compressive forces for offsetting the anticipated loads. Special multi-strand anchors are utilized, with ports for the desired number of tensioning cables. Individual cables are then strung between the anchors, tensioned and locked as described above for the conventional monofilament post-tensioning system.

As with monofilament installations, it is highly desirable to protect the tensioned steel cables from corrosive elements, such as de-icing chemicals, sea water, brackish water, and even rain water which could enter through cracks or pores in the concrete and eventually cause corrosion and loss of tension of the cables. In multi-strand applications, the cables typically are protected against exposure to corrosive elements by surrounding them with a metal duct or, more recently, with a flexible duct made of an impermeable material, such as plastic. The protective duct extends between the anchors and in surrounding relationship to the bundle of tensioning cables. The flexible duct, which typically is provided in 20 to 40 foot sections, is sealed at each end to an anchor and between adjacent sections of duct to provide a water-tight channel. Grout then may be pumped into the interior of the duct in surrounding relationship to the cables to provide further protection.

Several approaches have been tried to solve the problem of quickly, inexpensively and securely sealing the joints between adjacent sections of duct used in multi-strand post-tensioned applications. However, all prior art devices have utilized a plurality of arcuate sections which must be assembled at a joint around the ends of adjacent duct sections. Wedges, compression bolts or the like then are used to compress the joined sections into sealing engagement with the duct and with each other. Such prior art devices have been cumbersome to use and have proved somewhat unreliable in their ability to exclude moisture or other corrosive elements from the interior of the ducts.

Several patents have issued relating to duct couplers. For example, U.S. Pat. No. 5,320,319, issued on Jun. 14, 1994 to K. Luthi, describes a coupling element which is fitted with chamfered flanges. The sheaths of the coupler have protrusions which are inserted into the coupling element with a tubular element which forms the end of the sheaths. A sealing ring is inserted between each of the flanges and protrusions of the sheaths. The flanges and the protrusions are held together by sloping surfaces and by a groove worked within each socket. Also, U.S. Pat. No. 5,474,335, issued on Dec. 12, 1995 to the present inventor, describes a duct coupler for joining and sealing between adjacent sections of the duct. The coupler includes a body with flexible cantilevered sections on the end of the body adapted to pass over annular protrusions on the duct and locking rings for locking the cantilevered flexible sections into position, so as to lock the coupler onto the duct.

U.S. Pat. No. 5,775,849, issued on Jul. 7, 1998 to the present inventor, describes a coupler as used for ducts in post-tension anchorage systems. This duct system includes a first duct having a plurality of corrugations extending radially outwardly therefrom, a second duct having a plurality of corrugations extending radially outwardly therefrom, and a tubular body threadedly receiving the first duct at one end and threadedly receiving the second duct at the opposite end. The tubular body has a first threaded section formed on an inner wall of the tubular body adjacent one end of the tubular body and a second threaded section formed on the inner wall of the tubular body adjacent an opposite end of the tubular body. The threaded sections are formed of a harder polymeric material than the polymeric material of the first and second ducts. The tubular body has an outer diameter which is less than the diameter of the ducts at the corrugations. The first and second threaded sections have a maximum inner diameter which is less than the outer diameter of the ducts at the end of the ducts. First and second elastomeric seals are affixed to opposite ends of the tubular body and juxtaposed against a surface of a corrugation of the first and second ducts.

U.S. Pat. No. 5,954,373, issued on Sep. 21, 1999 to the present inventor, describes a different type of duct coupler apparatus. The duct coupler apparatus of this patent includes a tubular body with an interior passageway between a first open end and a second open end. A shoulder is formed within the tubular body between the open ends. A seal is connected to the shoulder so as to form a liquid-tight seal with a duct received within one of the open ends. A compression device is hingedly connected to the tubular body for urging the duct into compressive contact with the seal. The compression device has a portion extending exterior of the tubular body. The compression device includes an arm with an end hingedly connected to the tubular body and having an abutment surface adjacent the end. The arm is movable between a first position extending outwardly of an exterior of the tubular body and a second position aligned with an exterior surface of the tubular body. A latching member is connected to an opposite end of the arm and serves to affix the arm in the second position. The abutment surface of the arm serves to push a corrugation of the duct against the seal and against the shoulder so as to form a liquid-tight seal between the duct and the interior of the coupler.

U.S. Pat. No. 6,764,105, issued on Jul. 20, 2004 to the present inventor, describes a duct coupler apparatus for use with precast concrete segmental construction. This coupler has a first duct, a first coupler member extending over and around an exterior surface of the first duct and having a seat opening adjacent an end of the first duct, a second duct, a second coupler member extending over and around an exterior surface of the second duct and a seat opening adjacent to an end of the second duct, and gasket received in the seats of the first and second coupler members. An external seal is affixed to an opposite end of the first coupler member and affixed to an exterior surface of the first duct. The seats of the first and second coupler members have slots facing one another. The gasket is received within these slots.

U.S. Pat. No. 6,752,435, issued on Jun. 22, 2004 to the present inventor, describes a symmetrical coupler apparatus for use with precast concrete segmental construction. This coupler member has a first duct, a first coupler member extending over and around an exterior surface of the first duct and an end opening adjacent an end of the first duct, a second duct, a second coupler member extending over and around an exterior surface of the second duct and an end opening adjacent to an end of the second duct, and a gasket received in the ends of the first and second coupler members. The gasket serves to prevent liquid from passing between the ends of the coupler members into an interior of either of the first and second ducts. An external seal is affixed to an opposite end of the first coupler member and affixed to an exterior surface of the first duct. An internal seal is interposed in a generally liquid-tight relationship between an interior surface of the second coupler member and an exterior surface of the second duct.

U.S. Pat. No. 6,834,890, issued on Dec. 28, 2004 to the present inventor, teaches a coupler apparatus for use with a tendon-receiving duct in a segmental precast concrete structure. This coupler apparatus includes a coupler body having an interior passageway for receiving the duct therein. The coupler body has a generally U-shaped channel formed at one end thereof. The coupler element has a connector element formed on an interior thereof adjacent one end of the coupler body so as to allow the coupler element to receive a variety of implements for the formation of the precast concrete segment.

U.S. Pat. No. 6,874,821, issued on Apr. 5, 2005 to the present inventor, describes a coupler apparatus for use with angled post-tension cables in precast concrete segmental construction. This coupler apparatus has a first duct, a first coupler member extending over and around the first duct, a second duct, a second coupler member extending over and around the second duct and a gasket received at the ends of the first and second coupler members so as to prevent liquid from passing between the coupler members into an interior of either of the ducts. The ducts extend at a non-transverse acute angle with respect to the ends of the coupler members.

Heat shrink seals are affixed to the opposite ends of the coupler member so as to secure the coupler members to the ducts in liquid-tight relationship. The ends of the coupler member have generally V-shaped grooves facing each other. The gasket is received in compressive relationship within the V-shaped grooves.

U.S. Pat. No. 7,273,238, issued on Sep. 25, 2007 to the present inventor, teaches a duct coupler apparatus with compressible seals. This apparatus is used for joining the ends of a pair of ribbed ducts together. The apparatus has a collar with an interior suitable for receiving the ends of the pair of ducts therein. A first coupler element is translatably secured adjacent a first end of the collar. A compressible seal is disposed between a surface of the first coupler element and the first end of the collar. A second coupler element is secured adjacent a second end of the collar. A second seal is disposed between a surface of the second coupler element and the second end of the collar. The coupler elements are translatable so as to compress the seal such that a surface of the seal will bear against a respective rib of the pair of ducts.

U.S. Pat. No. 7,267,375, issued on Sep. 11, 2007 to the present inventor, describes a duct coupler apparatus. This apparatus is for joining ends of a pair of ducts together in end-to-end relationship. The apparatus has a collar with a first end portion and a second end portion. A first coupler element is translatably secured to an exterior of the collar for moving the first end portion between first and second positions. A second coupler element is translatably secured to the exterior of the collar so as to move the second end portion between first and second positions. The end portions have a plurality of fingers that are movable so as to be free of the surfaces of the duct when in the first position and which contact a rib of the duct when in the second position. The collar and the coupler elements form a liquid-tight seal over the respective ends of the pair of ducts.

Dry joints have been properly used in the past in which bridge segments are formed by match casting. The prevalence in the past of dry joints is due to its lower cost and time for construction. There is no gluing material to seal up the joint. As such, leakage through the joint into the box culvert occurs from time to time which may affect the durability of external post-tensioning tendons. Moreover, owing to the effect of seismic, temperature and creep, the joints are found to open under these conditions.

Wet joints involve the use of epoxy glue at the matting precast segments. After the application of epoxy glue, a temporary precompression pressure is applied by stress bars at the top, bottom and the sides of the matting precast segments. The epoxy sets under the applied pressure. The use of epoxy joints provides lubrication to help in the fit-up and the alignment of the matting segments and minimizes the effect of hard point contact between segments.

Whenever there is a need for a wet joint, it is often difficult to effectively connect the duct work extending through the precast segments. In the past, shrink wrap has been utilized in association with joining such ducts in an end-to-end relationship. The use of such heat shrink material is expensive, requires a great amount of labor, and can be easily punctured. In other circumstances, taping has been applied so as to join the ends of the ducts together in the wet joint area. Under these circumstances, it is often possible for the heat shrink material or the taping to leak. As such, the liquids used for the wet joint can intrude into the interior of the duct work and can cause damage to the tendons extending therethrough. As such, a need has develop so as to allow for the use of poured-concrete wet joints which avoids the need of epoxy while, at the same time, assures a liquid-tight relationship between the ends of the ducts located within the wet joint.

It is an object of the present invention to provide a duct system for use with concrete segmental construction but allows for the formation of a wet joint with concrete material.

It is an object of the present invention to provide a duct coupling system which allows the ducts to be effectively coupled in a liquid-tight manner within the area formed by the wet joint.

It is still another object of the present invention to provide a duct coupling system which is easy to utilize and requires a minimum of man power to effect.

It is still another object of the present invention to provide a duct coupling system which is of a minimal cost.

It is a further object of the present invention to provide a duct coupling system which avoids the use of heat shrink materials or taping materials.

It is still a further object of the present invention to provide a duct coupling system that effectively establishes a liquid-tight seal between the respective coupled ducts.

It is still a further object of the present invention to provide a duct coupling system which allows the coupler to be formed through an injection molding process.

These and other objects and advantages of the present invention will become apparent from a reading of the attached specification and appended claims.

BRIEF SUMMARY OF THE INVENTION

The present invention is a duct coupling system which comprises a first concrete segment, a second concrete segment, a first duct positioned in the first concrete segment so as to have an end extending outwardly therefrom, a second duct positioned in the second concrete segment so as to have an end extending outwardly therefrom, and a tubular member slidably positioned over the first and second ducts so as to join the ducts in a liquid-tight relationship.

In the present invention, the second concrete segment is in spaced relationship to the first concrete segment. A wet joint can be formed between the first and second concrete segments. The ends of the first and second ducts and the tubular member are embedded in the wet joint.

The first duct is formed of a polymeric material. The end of the first duct extends outwardly from the first concrete segment so as to face the second concrete segment. The first duct has a plurality of ridges extending outwardly therefrom. In particular, the plurality of ridges includes a first ridge and a second ridge in spaced relationship to the first ridge. One of the ridges is adjacent to the end of the duct.

The second duct is positioned in the second concrete segment so as to have an end extending outwardly therefrom so as to face the first concrete segment. The second duct includes a plurality of ridges. The plurality of ridges includes a first ridge and a second ridge. One of the ridges is adjacent to the end of the second duct. Each of the first and second ducts is formed of a polymeric material.

The tubular member is slidably positioned over the first and second ducts. The tubular member is movable between a first position overlying one of the first and second ducts to a second position overlying the ends of both the first and second ducts. The tubular member has an interior overlying and adjacent to the ridges of the ducts. The tubular member will have an inner diameter greater than the outer diameter of the duct. The tubular member is formed of a polymeric material. The tubular member will reside in liquid-tight sealing relationship with the duct. The tubular member has one end positioned over one of the ducts and the other end positioned over the other of the ducts.

In the present invention, there is a first seal that is affixed over the first duct. This first seal is in the nature of a elastomeric O-ring. The first seal can be positioned between the first and second ridges. The first seal will reside in liquid-tight sealing relationship between the tubular member and the first duct. The first seal can bear against one of the ridges when the tubular member is in the second position.

A second seal is affixed over the second duct. The second seal is positioned between the first and second ridges of the second duct. The second seal is also in the nature of an elastomeric O-ring that resides in liquid-tight sealing relationship between the tubular member and the second duct.

The present invention is also a process for the forming of a wet joint between a first concrete segment and a second concrete segment. The method of the present invention includes the steps of: (1) forming a first concrete segment with a first duct embedded therein such that the first duct has an end extending outwardly of one side of the first concrete segment; (2) forming a second concrete segment with a second duct embedded therein such that the second duct has an end extending outwardly of one side of the second concrete segment; (3) applying a tubular member over the end of the first duct; (4) sliding the tubular member toward the second duct such that the tubular member has one end overlying the end of the first duct and an opposite end overlying the end of the second duct; and (5) applying a wet joint between the first and second concrete segments such that the wet joint embeds the ends of the first and second ducts and the tubular member therein.

The method of the present invention further includes the steps of applying a first seal around the first duct and applying a second seal around the second duct. Each of the first and second seals is in the nature of an elastomeric O-ring. The tubular member is placed over the first and second ducts such that the first and second seals establish a liquid-tight relationship between an inner surface of the tubular member and the ducts.

The foregoing Section is intended to describe, in generality, the preferred embodiment of the present invention. It is understood that modifications to this preferred embodiment can be made within the scope of the present invention. As such, this Section should not to be construed, in any way, as limiting of the scope of the present invention. The present invention should only be limited by the following claims and their legal equivalents.

DETAILED DESCRIPTION OF THE INVENTION

Figure 1:
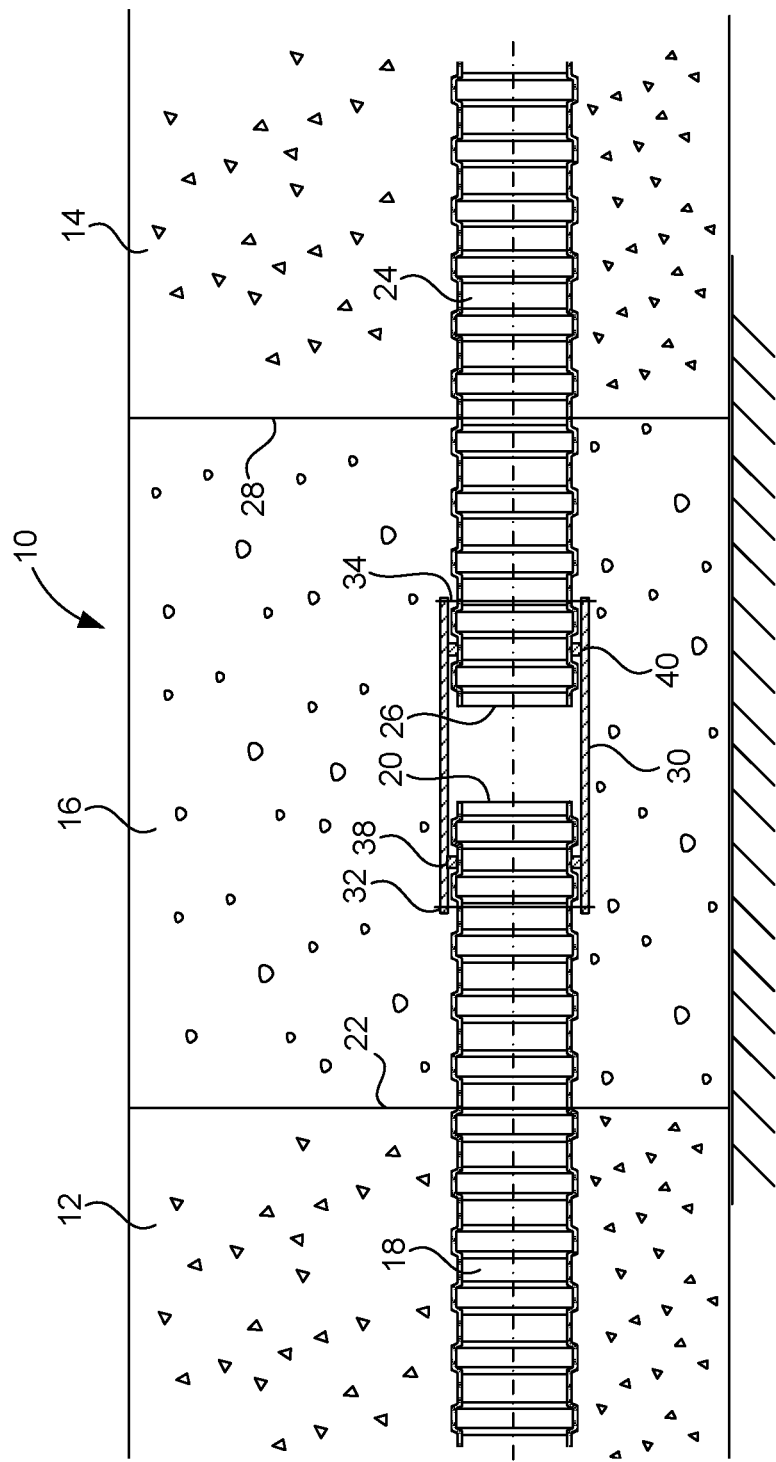
FIG. 1 is a cross-sectional view showing the concrete segmental system of the present invention.

Referring to FIG. 1, there is shown the segmental concrete construction 10 in accordance with the teachings of the present invention. The segmental concrete construction 10 of the present invention includes a first concrete segment 12, a second concrete segment 14 and a wet joint 16. The first concrete segment 12 has a first duct 18 embedded therein. The first duct 18 has an end 20 extending outwardly of a side 22 of the first concrete segment 12. The second concrete segment 14 has a second duct 24 embedded therein. The second duct 24 has an end 26 that extends outwardly of a side 28 of the second concrete segment 14. The end 20 of the first duct 18 is in alignment with and faces the end 26 of the second duct 24.

As can be seen in FIG. 1, there is a tubular member 30 that has one end 32 extending over and around the first duct 18 generally adjacent to the end 20. The tubular member 30 has a second end 34 which extends over and around the second duct 24 generally adjacent to the end 26. As such, the tubular member 30 will extend over the ends 20 and 26 so as to establish a liquid-tight seal therebetween. A first seal 38 is positioned over the outer diameter of the first duct 18 generally adjacent to the end 20. The first seal 38 establishes a liquid-tight seal between the inner wall of the tubular member 30 and the outer surface of the first duct 18. Another seal 40 extends around the second duct 24 generally adjacent to the end 26. The seal 40 establishes a liquid-tight seal between the inner surface of the tubular member 30 and the outer surface of the duct 24.

Once the tubular member 30 has been applied over the ends of the first duct 18 and the second duct 24, a proper liquid-tight sealing relationship is established between the ducts 24. At this time, the wet joint 16 can be poured into the area between the side 22 of the first concrete segment 12 and the side 28 of the second concrete segment 14. As such, the present invention allows concrete to be utilized as the wet joint 16 instead of the epoxy materials used in the prior art.

Figure 2:
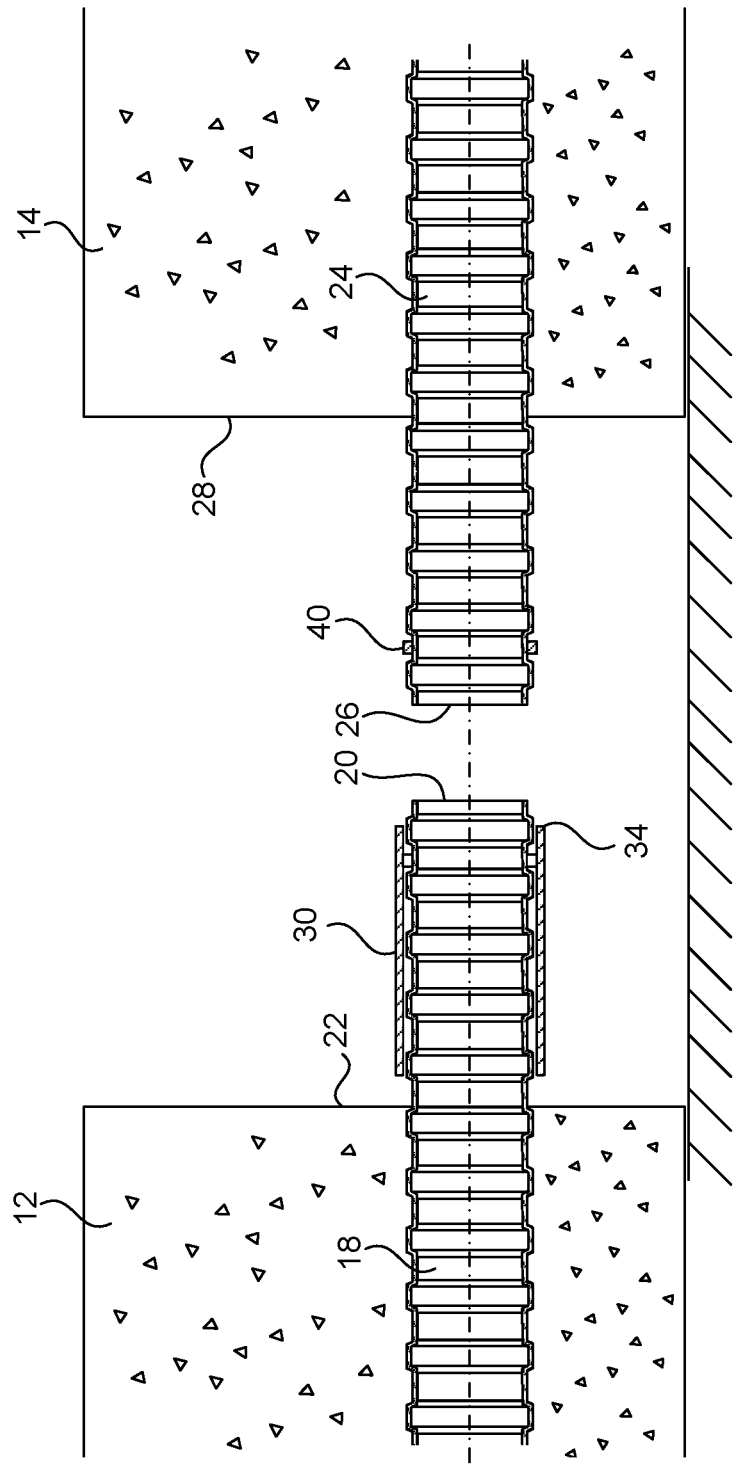
FIG. 2 illustrates an early state in the process of forming the segmental concrete construction in accordance with the teachings of the present invention.

FIG. 2 shows an initial step in the installation of the sealing system of the present invention. As can be seen in FIG. 2, the first duct 18 has an end 20 extending outwardly of the side 22 of the first concrete segment 12. The tubular member 30 is positioned in a first position so as to reside completely over the outer surface of the first duct 18. The end 34 of the tubular member 30 will reside in a location inwardly of the end 20 of the first duct 18.

The second duct 24 is illustrated as having an end 26 extending outwardly of the side 28 of the second concrete segment 14. The seal 40 is applied over the outer surface of the duct 24.

In order to complete the sealing arrangement (as shown in FIG. 1), it is only necessary to slide the tubular member 30 from the first position (illustrated in FIG. 2) to the second position (illustrated in FIG. 1). As such, the ends 34 of the tubular member 30 will overlie the exterior surface of the second duct 24 inwardly of the end 26. The seal 40 will bear against the inner wall of the tubular member 30 so as to establish the liquid-tight seal therein. After the tubular member 30 has been moved to the second position, then the concrete can then be poured so as to form the wet joint 16.

Figure 3:
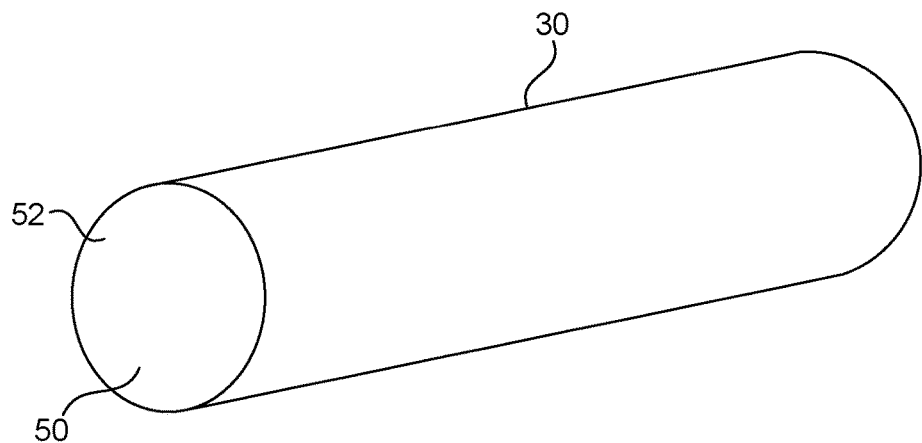
FIG. 3 is a perspective view of the tubular member as used for the joining of the ducts within the segmental concrete construction of the present invention.

FIG. 3 illustrates the tubular member 30. As can be seen, the tubular member 30 has an interior passageway 50 and an inner wall 52. The inner wall 52 is suitably positioned so as to properly establish a sealing relationship with each of the seals 30 and 40. The tubular member 30 should have a length suitable so as to extend between the ends of the respective ducts 18 and 24.

Figure 4:
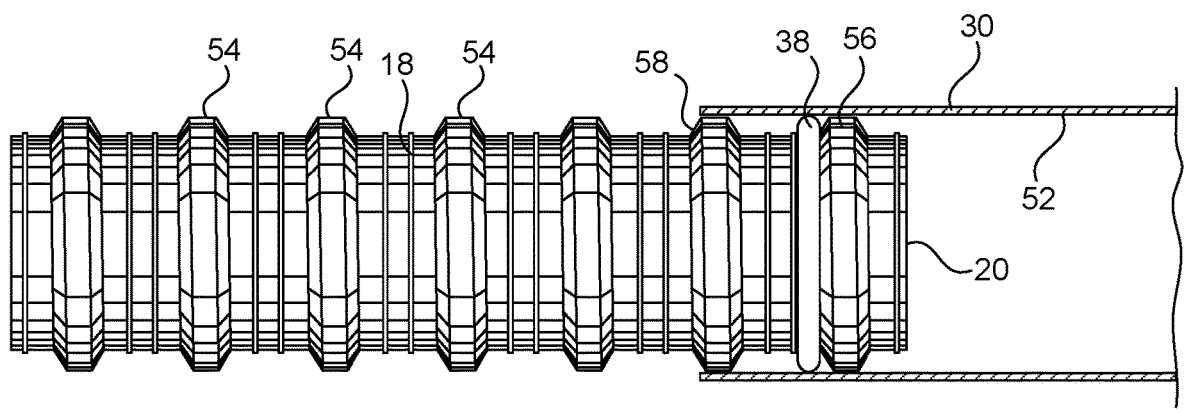
FIG. 4 is a side elevational view showing the tubular member in cross section as applied over the end of the first duct.

FIG. 4 illustrates, with particularity, the arrangement of the tubular member 30 as applied over the end 20 of the first duct 18. As can be seen in FIG. 4, the seal 38 is in the nature of an elastomeric O-ring seal that is applied over the exterior surface of the first duct 18. The first duct 18 has a plurality of ridges 54 which extend outwardly of the exterior surface of the first duct 18. In particular, the plurality of ridges 54 include a first ridge 56 and a second ridge 58. The elastomeric seal 38 is located in a position generally adjacent to the first ridge 56. The elastomeric seal 38 will have an outer diameter, when not compressed, which will be greater than the outer diameter of the ridges 54 of the first duct 18.

The tubular member 30 has an inner wall 52 which resides in close relationship over the first ridge 56 and the second ridge 58. As such, the seal 38 can bear tightly against the inner wall 52 of the tubular member 30 so as to establish the liquid-tight relationship.

The use of the first ridge 56 and the second ridge 58 establishes a limit of travel of the seal 38 during the movement of the tubular member 30 between the first position (illustrated in FIG. 2) and the second position (illustrated in FIG. 1). As such, if the seal 38 should move with the movement of the tubular member 30, further movement is blocked by the first ridge 56. As such, the seal 38 will properly reside against the ridge 56 and expand outwardly therefrom so as to establish the strong liquid-tight relationship with the inner wall 52 of the tubular member 30.

Each of the ducts and the tubular member 30 are formed of a polymeric material. In particular, each of these items can be easily formed through an injecting molding process.

Unlike the prior art, a simple sliding motion applied to the tubular member 30 will establish the proper seal between the ends of the ducts. As such, the present invention effectively avoids the use of heat shrink or shrink wrap materials. The present invention also eliminates the need for any taping that may be required in the area of the wet joint. The system of the present invention effectively avoids any liquid intrusion into the interior of the ducts 18 and 24 or into the interior of the tubular member 30.

The foregoing disclosure and description of the invention is illustrative and explanatory thereof. Various changes in the details of the illustrated construction or in the steps of the described method can be made is the scope of the present claims without departing from the true spirit of the invention. The present invention should only be limited by the following claims and their legal equivalents.

I claim:

1. A method of forming a wet joint between a first concrete segment and a second concrete segments, the method comprising:

forming the first concrete segment with a first duct embedded therein such that said first duct has an end extending outwardly of one side of the first concrete segment;

forming the second concrete segment with a second duct embedded therein such that said second duct has an end extending outwardly of one side of said second concrete segment;

applying a tubular member over the end of said first duct;

sliding longitudinally the tubular member from the end of the first duct toward the second duct such that the tubular member overlies the end of the first duct and overlies the end of the second duct;

forming a wet joint between the first and second concrete segments after sliding the tubular member such that said tubular member is embedded therein, further comprising before forming the wet joint:

applying a first seal around an exterior surface of said first duct adjacent the end thereof; and applying a second seal around an exterior surface of said second duct adjacent the end thereof, wherein the step of sliding comprises:

sliding the tubular member toward said second duct such that an inner wall of said tubular member bears against said first seal and said second seal in generally liquid-tight relationship, wherein said first duct having a first ridge and a second ridge in spaced relation to each other adjacent the end of said first duct, said second duct having a first ridge and a second ridge in spaced relation to each other adjacent the end of said second duct, the step of applying the first seal comprising:

applying the first seal in a location between said first ridge and said second ridge of said first duct, the step of applying the second seal comprising:

applying the second seal in a location between said first ridge and said second ridge of said second duct, and wherein the tubular member is a straight cylindrical sleeve, and in its final slid position the tubular member completely covers the first ridge and second ride of both the first duct and second duct, respectively.

2. The method of claim 1, said first seal being applied so as to bear against one of said first and second ridges of said first duct, said second seal being applied so as to bear against one of said first and second ridges of said second duct.

3. The method of claim 1, each of said first and second seals being an elastomeric O-ring.

* * * * *